Dec. 14, 1954 C. RINGWALD 2,696,964
ADJUSTABLE REARVIEW MIRROR
Filed Oct. 8, 1949 2 Sheets-Sheet 2
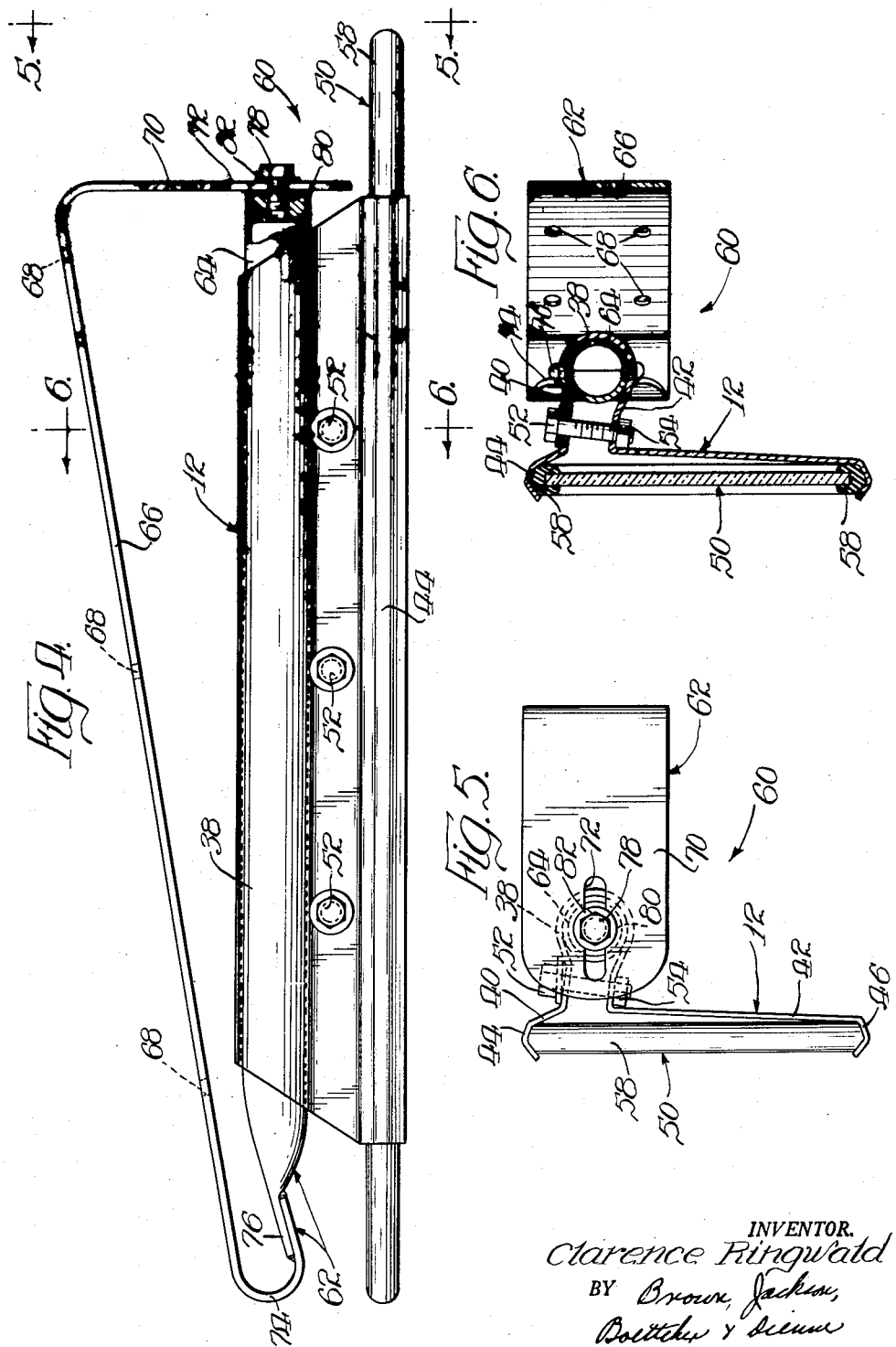
INVENTOR.
Clarence Ringwald
BY Brown, Jackson,
Boettcher & Dienner
Attys

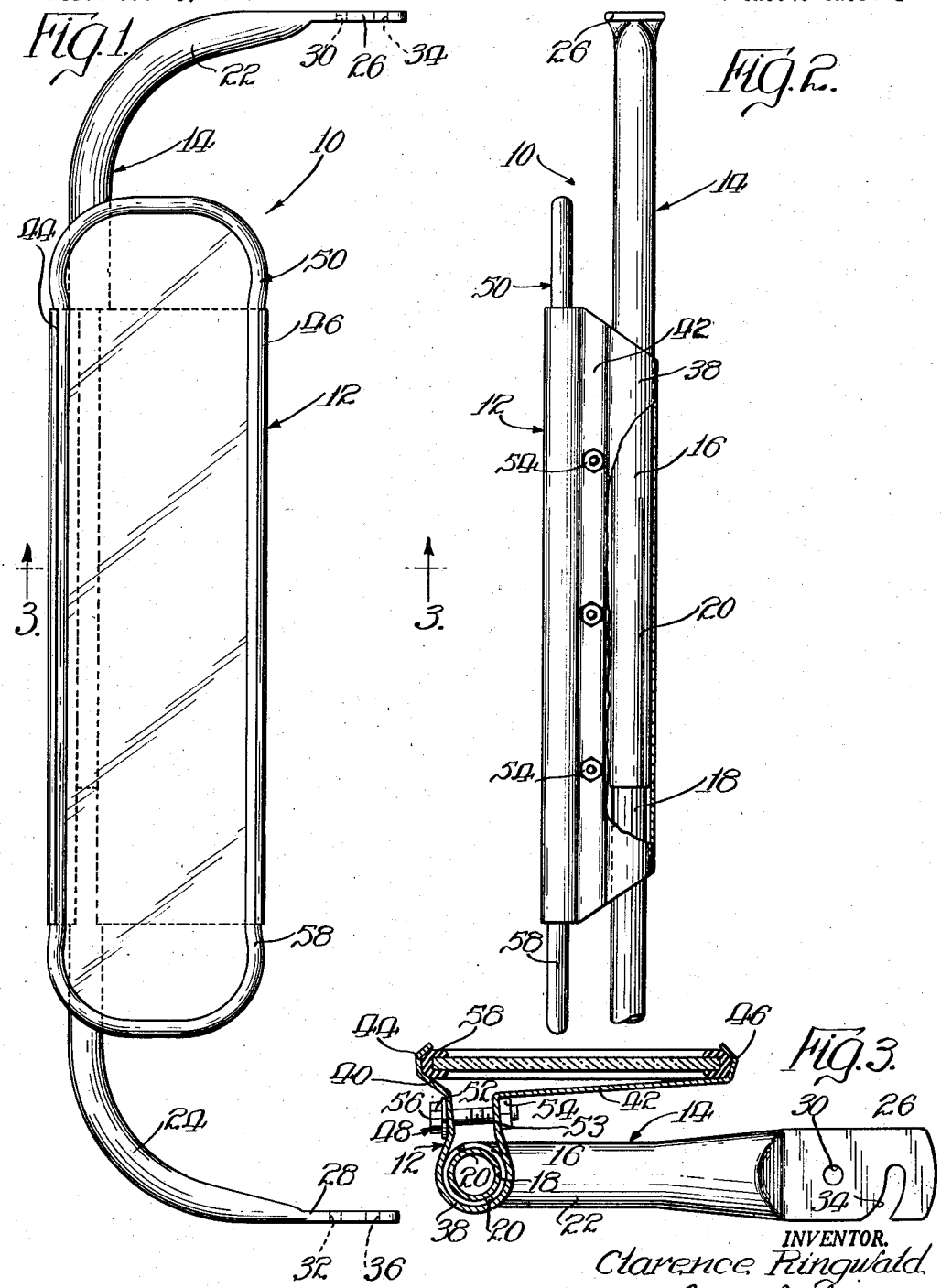

2,696,964

United States Patent Office

Patented Dec. 14, 1954

2,696,964

ADJUSTABLE REARVIEW MIRROR

Clarence Ringwald, Springfield, Ohio

Application October 8, 1949, Serial No. 120,297

3 Claims. (Cl. 248—288)

My invention relates to an adjustable mounting for mirrors and more particularly for so-called "rear-view" mirrors such as are employed on most road vehicles.

Among the objects of my invention are to provide a mounting for rear-view mirrors which readily permits of adjustment of the mirror about a vertical axis, about a horizontal axis, and also longitudinally along one of said axes; which when secured in a fixed position will retain that position, even though the mounting structure is subjected to vibrations and jars; which is sturdy but not heavy; which is easily formed from sheet metal and stock tubing; and which provides a clamping structure which is adapted, by one type of adjustable means, to grip the mirror, grip a supporting structure and maintain portions of the supporting structure in relatively fixed position.

Other objects, uses and advantages of the invention will become apparent, or be obvious, from the following description when taken with the drawings in which:

Figure 1 shows a vertical elevation of the adjustable mounting of my invention with a mirror secured in place;

Figure 2 is a fragmentary side elevation, viewed from the right side of Figure 1, with portions broken away to show internal structure;

Figure 3 is a horizontal, sectional view on the line 3—3 of Figure 1;

Figure 4 is a top plan view of a modified form of adjustable mounting of my invention with a mirror in place and with portions broken away to show internal structure;

Figure 5 is an end elevation looking in the direction of the arrows 5—5 of Figure 4; and Figure 6 is a sectional view on the line 6—6 of Figure 4.

Referring now to Figures 1, 2 and 3, the adjustable mounting for mirrors is indicated generally by the reference numeral 10 and it comprises a clamp structure, indicated generally by the reference numeral 12, and a supporting structure, indicated generally by the reference numeral 14. The supporting structure 14 may be said generally to include a shaft-like member which in this form of the invention comprises a pair of telescoping tubular members 16 and 18. It will be understood that the tubular member 18 could be replaced by a solid member if desired and that the cross section of the members 16 and 18 could take other cooperating shapes than circular, although the latter is preferable. The tubular member 16 has one or more longitudinally extending slots, such as the slots 20, which extend from the telescoping end of the member 16. Such slots permit the tubular member 16, when the latter is tightly gripped, to press against the member 18 and hold the two members 16 and 18 in relatively fixed position. The manner in which the tubular member 16 is so gripped will be pointed out below. The other ends 22 and 24, respectively, of the members 16 and 18 are angularly disposed with respect to the telescoping portions and the outermost ends 26 and 28 thereof are flattened and have both mounting apertures 30 and 32, respectively, and mounting slots 34 and 36, respectively.

The supporting structure 14 is well adapted for being mounted on the exterior of an automobile body or truck cab to the left of the driver's seat. It may, for example, be mounted by the apertures 30 and 32, or slots 34 and 36, on the pivot pin of door hinges. Since the distance between door hinges on various makes of cars or trucks will vary, it is desirable to have the supporting structure adjustable and such adjustability is provided in this form of the invention by the telescoping tubular members 16 and 18. While the supporting structure 14 is particularly well adapted for exterior mounting in the manner mentioned, it may be used on the interior of vehicles and may be used in buildings, adjacent doorways, and windows or in many other locations where an adjustable mirror is useful.

The clamp structure 12 has a bight portion 38 partially encompassing and bearing on the tubular member 16. Arms 40 and 42 extend generally parallel from the bight portion 38 for a distance and are spaced apart a lesser distance than the diameter of tubular member 16. The generally parallel, or intermediate, portions of the arms 40 and 42 then diverge sharply and the outermost ends of said arms provide jaws 44 and 46, respectively, said jaws being adapted to grip opposite edges of a mirror. The clamp member 12 is preferably formed of resilient sheet metal and the jaws 44 and 46 in their unstressed form are preferably spaced apart a lesser distance than the opposite edges of the mirror to be gripped so that the spring action of the arms 40 and 42 is adapted to resiliently grip the mirror when the adjustment means, indicated generally by the reference numeral 48, is not actuated to have the clamping structure 12 tightly clamp the supporting structure 14. It will be appreciated, however, that the jaws 44 and 46 of the arms 40 and 42, respectively, could be spaced apart the same distance as opposite edges of the mirror to be gripped, or greater distances apart than said edges, if desired, the mirror then being firmly gripped as the adjusting means 48 is actuated to cause the clamp structure 12 to clamp the supporting structure 14 and, at the same time, to cause the jaws to move toward each other to grip the edges of the mirror.

If the adjustable mounting 10 is secured in a vertical position by its ends 26 and 28 on the hinge pins of a door by means of the slots 34, it will be understood that the mirror, indicated generally by the reference numeral 50, can be tilted backwardly or forwardly from the vertical by shifting the slots 34 and 36 into different relative positions with respect to their associated hinge pins of the door hinge.

Adjustability of the mirror 50 around the vertical axis provided by the telescoping tubular members 16 and 18 is made possible by the adjustable means, indicated generally by the reference numeral 48. The adjustable means comprises one or more threaded bolt elements 52 each with a cooperating nut element 54. In the illustrated embodiment of the invention, as most readily seen in Figure 2, three bolts and three nuts are employed. It will be understood, however, that a greater or a lesser number could be employed and that single bolt and nut might suffice. I prefer, however, to employ a plurality of substantially equally spaced apart nuts and bolts which pass through aligned apertures in the generally parallel portions of the arms 40 and 42.

In the preferred form of the invention, a channel 53 is provided in the mid-portion of the arm 42, which channel is of such dimensions that the nut elements 54 are non-rotatable when seated in the channel. This conveniently serves to permit the bolt elements 52 to be tightened up or loosened by rotation in the appropriate direction without having to hold the nuts 54 by hand or by a tool. Washers 56 may be placed under the heads of the bolts 52 if desired, the shape of the mid-portion of arm 40 being such that a tool is able to grip and rotate the head of the bolt without interfering with other portions of the arm 40.

For convenience, the bolts 52 are positioned adjacent one edge of the mirror rather than being located behind it intermediate the edges of the mirror. It will be seen that if the arms 40 and 42 were made of equal length so that the intermediate portions thereof met behind the mid-portion of the mirror 50, it would be more difficult to use a tool on the bolt 52. Therefore, as shown in the drawings, I prefer to have the arms 40 and 42 of different lengths so that the bolts 52 may be more conveniently located for actuation, as shown. Since the nut elements 54 located in channel 51 are held against rotation, there is no need to use a tool in connection therewith and they may, accordingly, be disposed in a less conveniently reached position. The same advantages and conveniences are provided if the positions of the nuts and bolts are reversed.

When it is desired to shift the mirror from the position shown in Figures 1, 2 and 3, it is only necessary to loosen the adjustable means 48 by turning the bolts 52 in a direction to unthread them from the nuts 54. When this is done, the grip of the bight portion 38 of the clamp 12 on the tubular member 16 of the supporting structure 14 is released sufficiently to render easy the turning of the clamp structure 12 about the tubular member 16 as a pivot point. At such time, if it is desired to further separate the telescoping members 16 and 18, that may be done. When the bolts are again tightened up, the clamp structure 12 once again grips the supporting structure by binding the bight portion 38 around the tubular member 16, simultaneously causing the tubular member 16, through its slotted end, to grip the tubular member 18 and fix said two tubular members in the desired position relative to each other. If it is desired to remove the mirror from the jaws 44 and 46 of the arms 40 and 42, it is only necessary to loosen the bolts 52 sufficiently that the gripping action of the jaws caused by said bolts be removed so that the mirror may be withdrawn from the inherent resilient grip that the jaws 44 and 46 have on it.

It will be noted that the mirror shown in Figures 1, 2 and 3 has a rubber frame encircling the edges. Such frame 58 permits a better grip on the mirror by the jaws and also serves as a cushioning means and prevents chipping and rattling.

Turning now to the modified form of adjustable mounting, indicated generally by the reference numeral 60, and illustrated in Figures 4, 5 and 6, it will be seen that the clamping structure 12 is the same as that illustrated in Figures 1, 2 and 3. Consequently, the various portions of the clamping structure 12 are indicated by the same reference numerals as used in Figures 1, 2 and 3 and will, therefore, not be redescribed. The supporting structure, indicated generally by the reference numeral 62, is, however, different and will now be described in detail. The supporting structure 62 comprises essentially a longitudinally extending shaft-like member 64, which, in its preferred form, is tubular with a circular cross section, and a generally L-shaped mounting bracket 66 which has a plurality of apertures 68 through which may be passed securing elements, such as screws, by which the whole supporting structure 62 may be fastened in some desired location, for example, within a passenger compartment of a vehicle above the windshield. The mounting bracket 66 has a shorter arm 70 extending at an angle with respect to the longer arm in which the apertures 68 are disposed and said shorter arm contains at its outer end a slot 72. At the other end of the longer arm there is an extension 74, preferably integral with the supporting bracket 66, to which extension is secured the flattened end 76 of the longitudinally extending tubular shaft-like member 64. The extension 74 of the mounting bracket is resilient and provides, in effect, a hinged or pivoted connection whereby the other end (the right-hand end as viewed in Figure 4) may be moved through an arcuate path. The limitation upon movement in an arcuate path is provided by a securing means, such as the bolt 78, which is threaded into a threaded plug 80 which is fixed in the open end of the tubular member 64. The shaft of the threaded bolt 78 passes through the slot 72 in the short arm 70 of the mounting bracket 66 and, when tightened up against said arm 70, either with or without the use of an intermediary washer, such as a washer 82, holds the tubular shaft 64 in the selected position. The normal, untensioned position of the shaft 64 is such that the bolt 78 lies intermediate the ends of the slot and, when the bolt 78 is loosened, the tubular shaft 64 may be rotated about its other end 76, by reason of the resilient connection with the extension 74 of the bracket 66 so that rotation in a horizontal plane about a vertical axis is possible. Tightening up of the bolt 78 in the selected position will hold the shaft 64 where desired. Then, the clamping member 12 may be rotated about the tubular shaft 64, so that the mirror will also have adjustment around a horizontal axis in substantially the same manner as was described above with respect to the device of Figures 1, 2 and 3, by adjustment of the adjustable means 48, which, in the illustrated structure, consists of bolts 52 and nuts 54. When the bolts 52 are loosened so that the clamping structure 12 may rotate about the tubular shaft 64, it is also possible to shift the clamping structure 12 longitudinally of the shaft 64 within the limits provided by the length of said shaft and the longitudinal extent of the bight portion 38 of the clamp structure 12.

While the arms 40 and 42 of the clamp structure 12 of Figures 1 through 6 are shown as being united by a bight portion 38, the clamp structure can be made to operate, as described, if the bight portion is split centrally along its length so that arms 40 and 42 are individual elements interconnected only by the adjustable means 48, comprising the nuts 54 and bolts 52.

From the foregoing description it will be seen that while the preferred embodiments have been illustrated, I do not intend to be limited thereto, except insofar as the appended claims are so limited, since changes or modifications coming within the scope of the invention will be suggested to others by my disclosure.

I claim:

1. An adjustable mounting for mirrors comprising a pair of arms, each arm having a jaw and said jaws being adapted to grip opposite edges of a mirror between them, a longitudinally extending supporting structure, said arms by their ends opposite from said jaws having a bearing on, and being adjustable about, said longitudinally extending supporting structure, and adjustable means interconnecting said arms at their intermediate portions and being adapted, when adjusted in one direction, to cause said jaws to grip a mirror between them and to cause said arms to grip said supporting structure, said supporting structure comprising a pair of telescoping tubular members, the outer one of which is slotted longitudinally a portion of its length whereby movement of the adjustable means of the clamp structure in said one direction will not only serve to grip the mirror between the jaws and grip the telescoping members by the bight portion of the clamp but also will secure the telescoping members in fixed position relative to each other.

2. An adjustable mounting for mirrors comprising a supporting structure having a shaft-like member, and a clamp structure, said clamp structure having a bight portion partially encompassing the shaft-like member of said supporting structure, arms connected with said bight portion and extending generally parallel to each other for a distance, and being there spaced apart a lesser distance than the diameter of said shaft-like member, and then diverging from each other and having at their outermost ends jaws between which the opposite edges of a mirror may be gripped, and adjustable means interconnecting the generally parallel portions of said clamp structure, said means when adjusted in one direction causing the bight portion to grip the shaft-like member of the supporting structure and the jaw portions to grip the edges of a mirror and, when adjusted in another direction, permitting the clamp structure to be rotatable about, and movable longitudinally along, the shaft-like member, said shaft-like member comprising a pair of telescoping tubular members, the outer one of which is slotted longitudinally a portion of its length whereby movement of the adjustable means of the clamp structure in said one direction will not only serve to grip the mirror between the jaws and grip the telescoping members by the bight portion of the clamp but also will secure the telescoping members in fixed position relative to each other.

3. The adjustable mounting of claim 2 wherein the telescoping members each have an angularly directed arm with a mounting slot in each arm for mounting the supporting structure.

References Cited in the file of this patent

UNITED STATES PATENTS

| Number | Name | Date |
| --- | --- | --- |
| 663,121 | Frost | Dec. 4, 1900 |
| 828,164 | Williams | Aug. 7, 1906 |
| 1,014,471 | Herold | Jan. 9, 1912 |
| 1,380,910 | Hubbard | June 7, 1921 |
| 1,465,185 | Sandberg | Aug. 14, 1923 |
| 1,465,213 | Feinberg | Aug. 14, 1923 |
| 1,555,659 | Gough | Sept. 29, 1925 |
| 1,651,896 | La Hodny | Dec. 6, 1927 |
| 1,926,392 | Kritzer | Sept. 12, 1933 |
| 1,938,541 | Oishei | Dec. 5, 1933 |